United States Patent
Pacheco et al.

(10) Patent No.: US 11,794,904 B2
(45) Date of Patent: Oct. 24, 2023

(54) COMPACT ROTORCRAFT SEATING ASSEMBLY WITH NON-LINEAR BUCKET GUIDE CHANNELS

(71) Applicant: AMI Industries, Inc., Colorado Springs, CO (US)

(72) Inventors: Chad Pacheco, Colorado Springs, CO (US); Moises Perez, Miami, FL (US); Douglas E. Hoover, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 50 days.

(21) Appl. No.: 17/522,426

(22) Filed: Nov. 9, 2021

(65) Prior Publication Data

US 2023/0144561 A1     May 11, 2023

(51) Int. Cl.
 B64D 11/06     (2006.01)
(52) U.S. Cl.
 CPC ...... B64D 11/0696 (2013.01); B64D 11/0649 (2014.12)
(58) Field of Classification Search
 CPC .......................... B64D 25/04; B64D 11/0696
 See application file for complete search history.

(56) References Cited

U.S. PATENT DOCUMENTS

| | | | |
|---|---|---|---|
| 5,133,587 A * | 7/1992 | Hadden, Jr. | ........ B60N 2/42709 297/146 |
| 8,408,643 B2 | 4/2013 | Honnorat | |
| 9,382,008 B2 | 7/2016 | Fornecker | |
| 9,981,574 B2 | 5/2018 | Olivares | |
| 10,272,805 B2 * | 4/2019 | Coman | ..................... F41H 7/02 |

(Continued)

FOREIGN PATENT DOCUMENTS

| | | |
|---|---|---|
| CN | 112141344 A | 12/2020 |
| GB | 2222937 A | 3/1990 |

OTHER PUBLICATIONS

Desjardins, Stanley P., "The Evolution of Energy Absorption Systems for Crashworthy Helicopter Seats", American Helicopter Society 59th Annual Forum, Phoenix Arizona, May 6-8, 2003, 26 pages.

(Continued)

*Primary Examiner* — Brady W Frazier
*Assistant Examiner* — Shanna Danielle Glover
(74) *Attorney, Agent, or Firm* — Suiter Swantz pc llo

(57) ABSTRACT

A rotorcraft seating assembly includes a seat base supporting a seat bucket, the seat base having left- and right-side panel portions. Each side panel portion has a linear bucket guide channel set into its inside face (including an upper portion for adjusting the seat bucket relative to the seat base for pilots of varying heights, and a lower portion for energy attenuation (EA) stroking in response to a crash event) and a bucket guide slot set into its outside face (including a linear upper portion corresponding to the range of adjustment of the seat bucket and a curved lower portion allowing the seat bucket to translate forward and away from the seat base during EA stroking). The curved outer bucket guide slot allows for the required EA stroking distance within a minimal vertical space between the seat bucket and the flight deck floor.

10 Claims, 20 Drawing Sheets

(56) References Cited

U.S. PATENT DOCUMENTS

| | | | |
|---|---|---|---|
| 2007/0029444 A1* | 2/2007 | Mercier | B60N 2/42736 |
| | | | 297/216.16 |
| 2009/0045659 A1 | 2/2009 | List et al. | |
| 2009/0267390 A1 | 10/2009 | Honnorat et al. | |
| 2015/0145295 A1* | 5/2015 | Cecinas | B60N 2/42718 |
| | | | 297/325 |

OTHER PUBLICATIONS

Extended European Search Report dated Mar. 28, 2023; European Application No. 22206083.2.

* cited by examiner

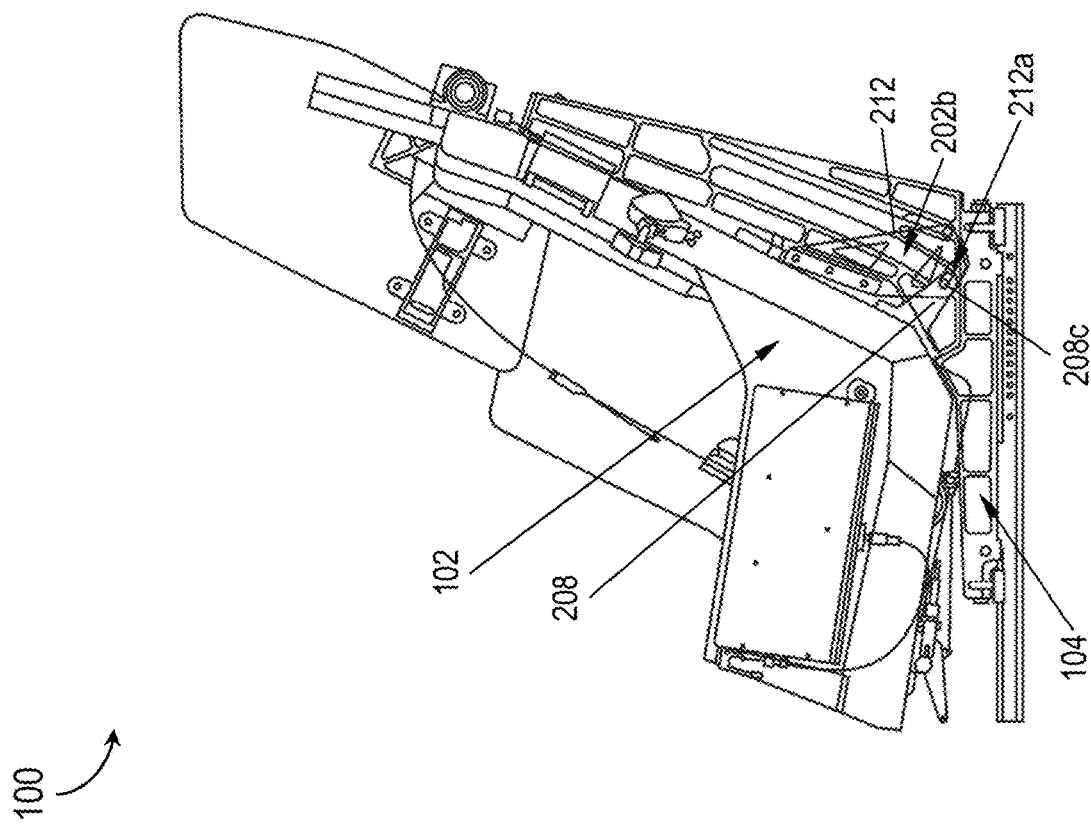
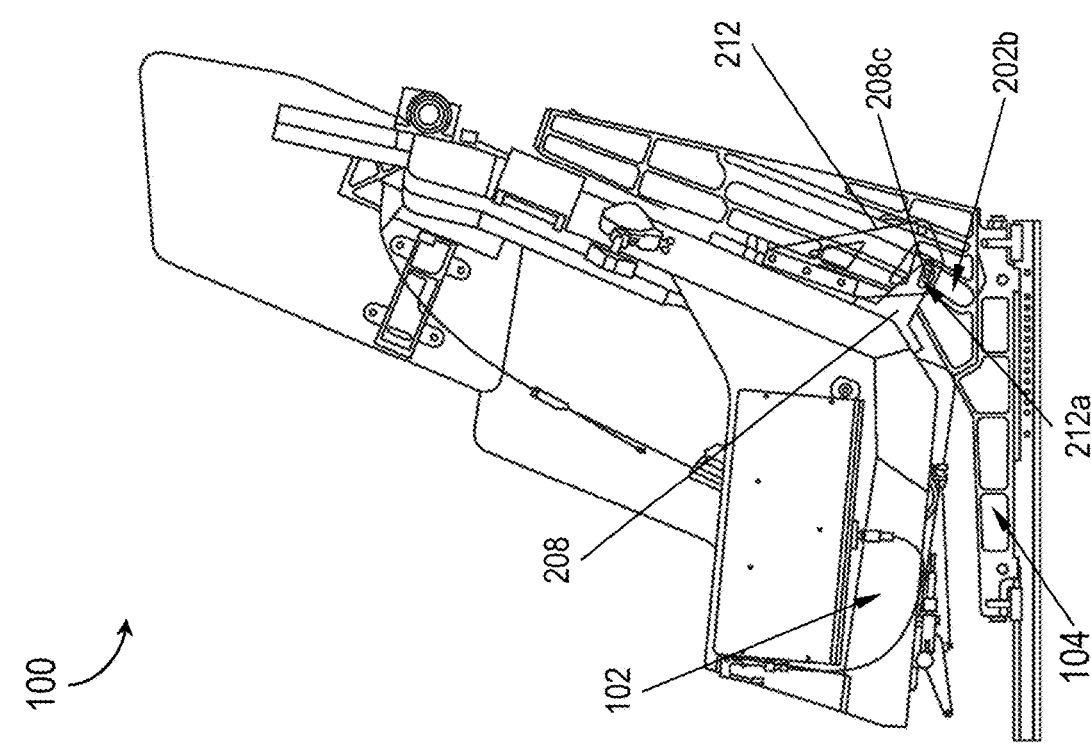

COMPACT ROTORCRAFT SEATING ASSEMBLY WITH NON-LINEAR BUCKET GUIDE CHANNELS

TECHNICAL FIELD

Embodiments of the inventive concepts disclosed herein are directed generally to seating assemblies and particularly for cockpit seating for rotorcraft operators.

BACKGROUND

Seating for helicopters and/or rotorcraft (e.g., for pilots, operators, and/or passengers) require a stroking distance (which must be along a straight axis) for substantially vertical (e.g., Z-axis, parallel to the operator's spine) energy absorption and deceleration in response to a dynamic event. In a first aspect, seating must be able to accommodate a broad range of pilot heights. For example, the seat can be adjusted to accommodate very tall pilots, but at the expense of vertical stroking distance between the seat bucket and the cockpit floor. This problem may be addressed by a sub-floor, or an indentation or depression set into the cockpit floor into which the seat bucket may stroke below floor level. However, size, weight and power considerations (SWaP-c) may not always provide space for a sub-floor, leaving a limited amount of vertical space between the seat bucket and the floor in which to achieve the required stroking distance.

SUMMARY

A compact rotorcraft seating assembly with non-linear bucket guide channels is disclosed. In embodiments, the seating assembly includes a seat bucket and a seat base mountable to a cockpit or flight deck floor of a helicopter or other like rotorcraft. The seat base includes a base portion mountable to the floor and spaced-apart left and right side panel portions rising above the base portion at an obtuse angle (e.g., past vertical). Each of the left and right side panel portions includes a linear bucket guide channel set into the inside face and a bucket guide slot set into the outside face, the bucket guide slot having a straight linear upper portion transitioning into a curved lower portion. The seat base supports the seat bucket, and the seat bucket in turn supports a pilot or operator of the rotorcraft. The seat bucket is slidably connected to the inner bucket guide channels and outer bucket guide slots of each side panel portion, such that the seat bucket can be raised or lowered relative to the seat base (e.g., to accommodate shorter or taller pilots) by translating through the respective upper portions of the bucket guide channel and bucket guide slot. In the event of a crash or other like dynamic event, the crash energy (e.g., downward force) of the seat bucket is attenuated by translating through the lower portion of the straight inner bucket guide channel. At the same time, the seat bucket is pivoted forward and away from the seat base and flight deck floor (e.g., to avoid impact with the seat base or the flight deck floor) by transitioning through the curved lower portion of the bucket guide slot.

In some embodiments, the inner bucket guide channels and the outer bucket guide slots extend between the same top height and bottom height (e.g., corresponding to the endpoints of the channel or slot) relative to the seat base and cabin floor.

In some embodiments, an upper bracket assembly fixed to the seat bucket translates through the inner bucket guide channels, and a lower bracket assembly fixed to the seat bucket translates through the outer bucket guide slots.

In some embodiments, the upper bracket assembly includes an upper bracket support pivotably connected to the bracket assembly, the upper bracket support capable of attenuating the crash energy by stroking downward through the lower portion of the bucket guide channel opposite the curved portion of the bucket guide slot.

In some embodiments, the lower bracket assembly includes a lower support bracket that translates through the outer bucket guide slot via an inside bearing sharing a common axle with an outside bearing. In some embodiments, the lower bracket assembly also includes a stabilizer bracket fixed to the upper bracket assembly and including a slot through which the outside bearing translates.

In some embodiments, the seat base mounts to the cabin or cockpit floor via tracks fixed to the floor, the tracks extending in parallel (e.g., left-side and right-side) and the seat base capable of translating along the tracks.

In some embodiments, both the left-side and right-side tracks extend beneath the seat bucket.

In some embodiments, either of the left-side or the right-side tracks (but not both) extends beneath the seat bucket.

In some embodiments, the seat bucket reclines relative to the seat base.

In some embodiments, the rear faces of the left-side and right-side panel portions are positionable flush with a bulkhead wall of the rotorcraft.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 3D through 3F are left-side profile views of energy attenuation (EA) stroking operations of the seating assembly of FIGS. 3A through 3C;

Figure 1:
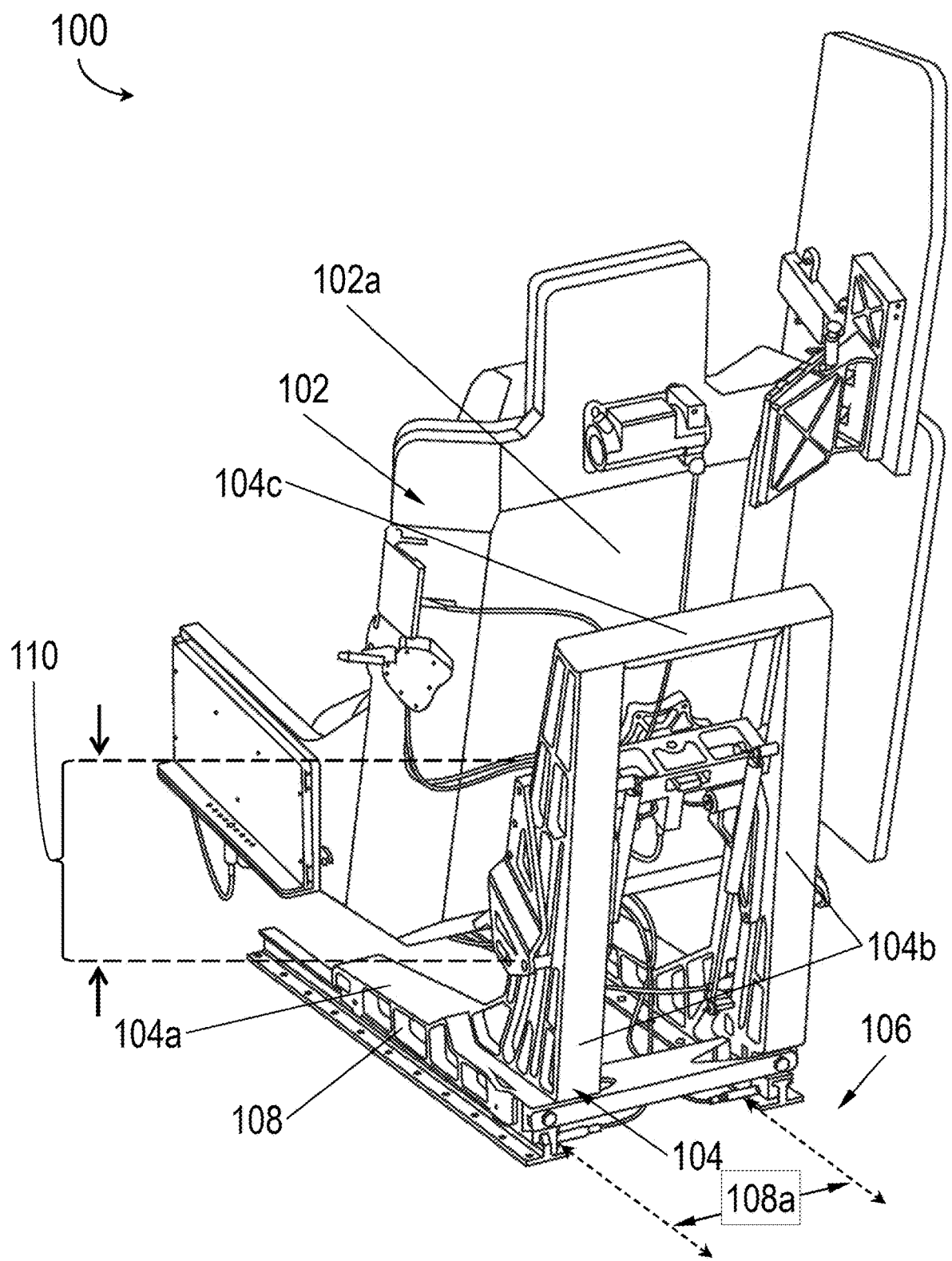
FIG. 1 is a rear isometric view illustrating a rotorcraft seating assembly according to example embodiments of this disclosure.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a helicopter seating assembly capable of providing full energy attenuation (EA) stroking during a crash or other like dynamic event within a minimal vertical space between the bottom of the seat bucket and the flight deck floor. In addition to the linear guide channel for EA stroking, a curved outer guide channel supports and guides the lower portion of the seat bucket forward and away from the base seat structure while stroking downward, preventing lateral sway of the seat bucket. Further, the use of a curved outer channel allows for a shorter base seat structure allows the seat bucket to recline further relative to the base seat structure, even when mounted directly ahead of a bulkhead wall.

Referring to FIG. 1, a seating assembly 100 for a helicopter or rotorcraft is shown. The seating assembly 100 may include a seat bucket 102 and a base seat structure 104.

In embodiments, the seat bucket 102 may be configured to accommodate a pilot, operator, or passenger of the rotorcraft. For example, the seat bucket 102 may be adjustable relative to the base seat structure 104, e.g., in order to accommodate pilots or other occupants of a wide range of height and build in a position where the pilot's eye level and/or positioning relative to rotorcraft controls may be optimal.

In embodiments, the base seat structure 104 may be mounted to a cockpit or cabin floor 106 of the rotorcraft. For example, the base seat structure 104 may be mounted to tracks 108 set into the flight deck floor 106, as described in greater detail below. In embodiments, the base seat structure 104 may include a base portion 104a and side panel portions 104b. For example, the base portion 104a may extend substantially horizontally along the flight deck floor 106 (and, e.g., may be directly mounted to the tracks 108), while left-side and right-side side panel portions 104b extend above the base portion at substantially obtuse angles. In some embodiments, the left-side and right-side panel portions 104b extend above the base portion at an angle not more than 120 degrees from the flight deck floor 106 (e.g., no more than 30 degrees from vertical); in other embodiments, this angle may vary according to the precise configuration of the cockpit or cabin.

In embodiments, the seat bucket 102 may be mounted to the side panel portions 104b and may be adjusted relative to the base seat structure 104. For example, the seat bucket 102 may be adjusted through a range 110 of incremental lockout adjustment positions relative to the base seat structure 104, e.g., adjusted upward to accommodate shorter pilots and adjusted downward to accommodate taller pilots. In some embodiments, the seat bucket 102 will accommodate any pilot between the 5$^{th}$ percentile (e.g., height/weight) for female operators and the 95$^{th}$ percentile for male operators.

In some embodiments, the tracks 108 extend along the flight deck floor 106 in parallel (108a) underneath the seat bucket 102. Accordingly, the base portion 104a of the base seat structure 104 may similarly comprise left-side and right-side portions extending forward from the left and right side panel portions 104b respectively, the left-side and right-side portions of the base portion each mounted to a corresponding track and likewise extending beneath the seat bucket 102. In some embodiments, the tracks 108 and the seat bucket 102 may be offset such that either of the left-side or right-side tracks extends fully beneath the seat bucket (but not both).

In some embodiments, the left-side and right-side portions of the base portion 104a may include a locking mechanism (not shown) via which the base seat structure 104 may be locked in one of several incremental positions relative to the tracks 108, e.g., via a pin-and-slot system or any other appropriate means of securing the base seat structure into a position relative to the tracks and to the flight deck floor 106.

In some embodiments, the left and right side panel portions 104b of the base seat structure 104 are configured to allow the seat bucket 102 to stroke downward in response to a crash event but also to pivot forward, allowing the seat bucket to attenuate downward force through a limited vertical space without impacting or damaging either the base portion 104a of the base seat structure, the tracks 108, or the flight deck floor 106. Similarly, in embodiments the height of the base seat structure 104 (e.g., terminating in cross-member 104c connecting the left and right side panel portions 104b) may be sufficiently low as to allow the seat bucket 102 to pivot forward without interference. For example, as the seat bucket 102 pivots forward, a seatback portion 102a thereof may tilt rearward toward the left and right side panel portions 104b. Further, in embodiments the height of the base seat structure 104 may allow the seat bucket 102 to recline relative to the base seat structure.

Figure 2A:
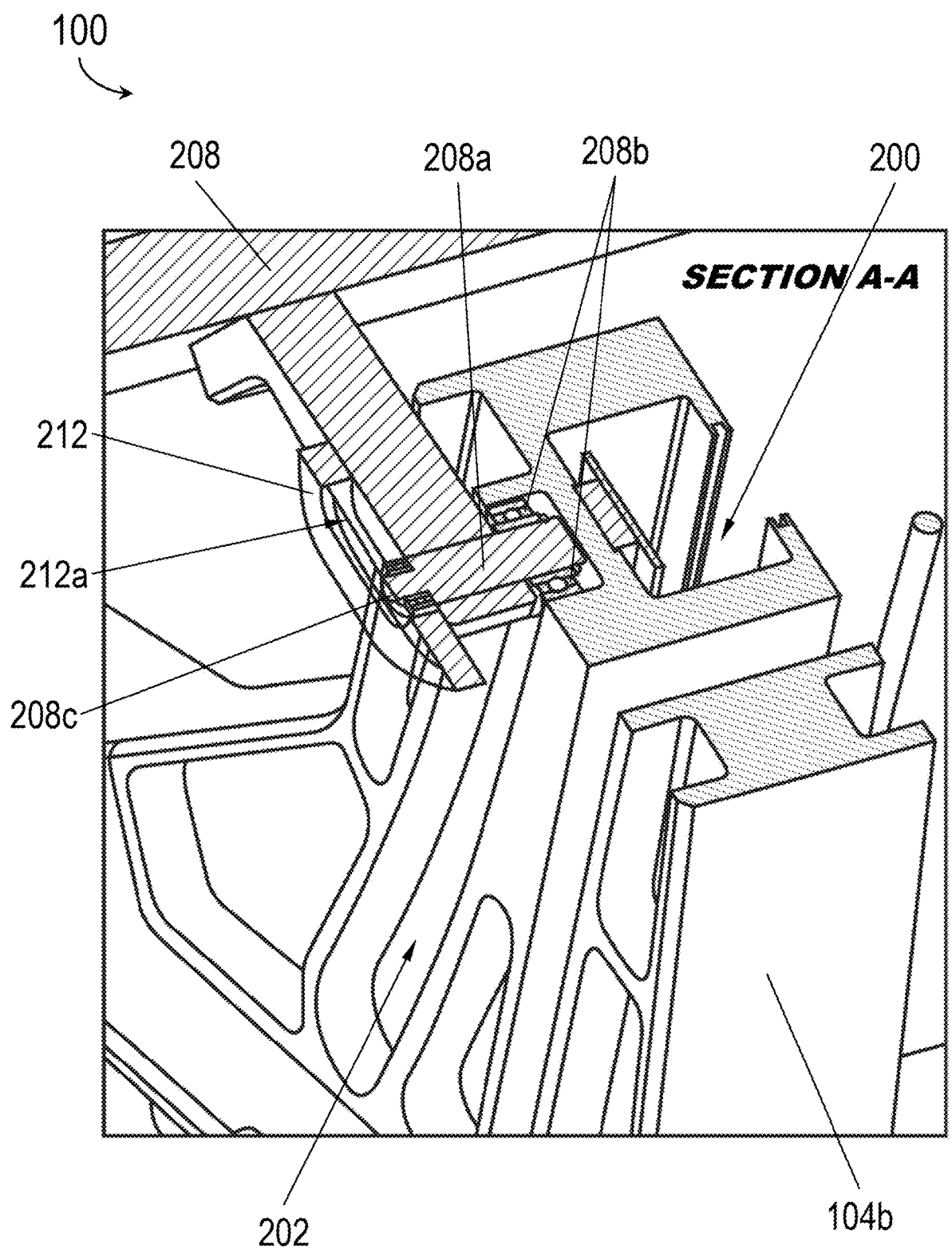
FIG. 2A is a detailed view of a side panel portion of a seat base of the seating assembly of FIG. 1 incorporating inner and outer guide channels.
Figure 2B:
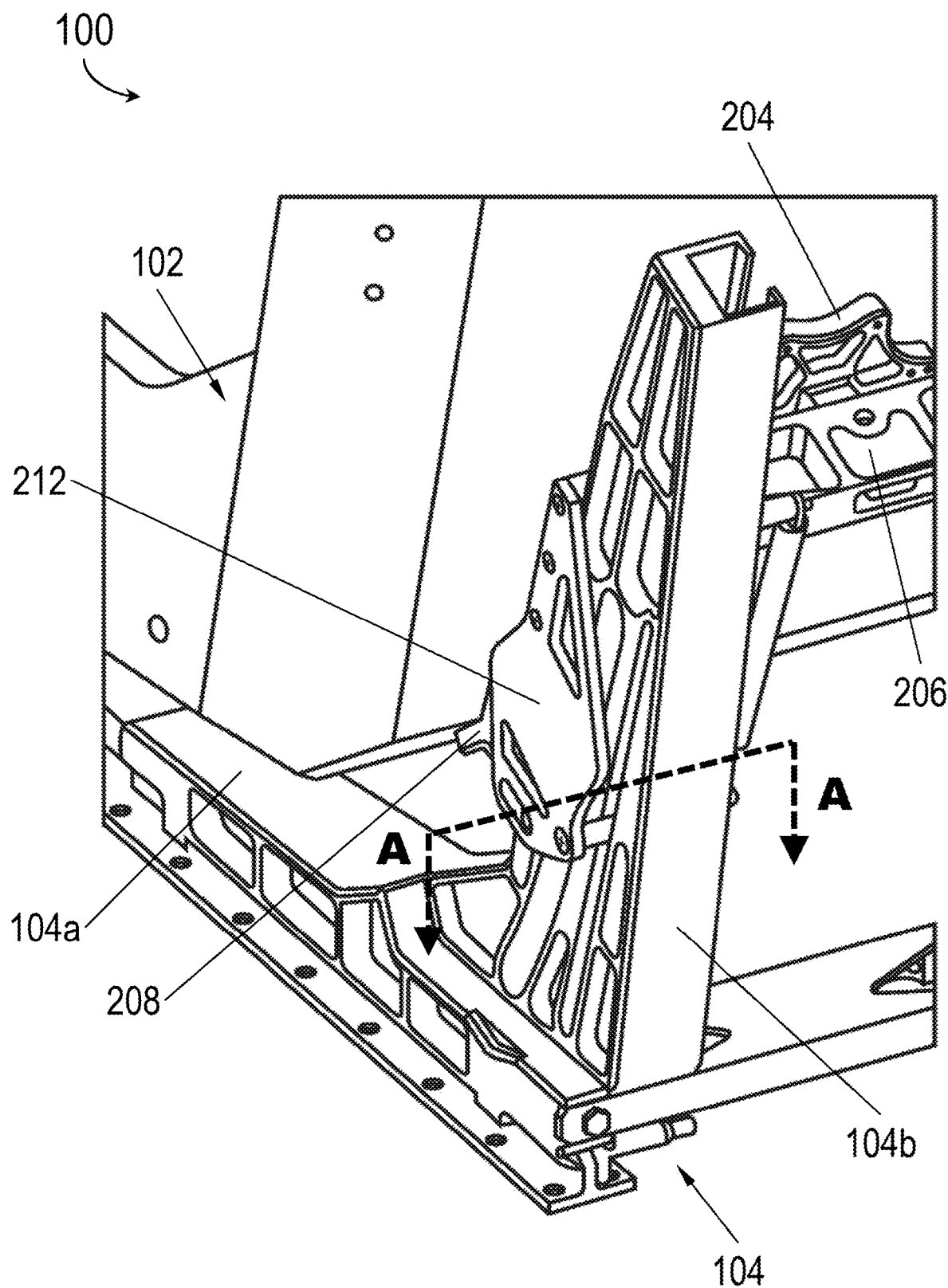
FIGS. 2B and 2C are respectively exterior and interior views of the side panel portion of the seat base of FIG. 1.
Figure 2C:
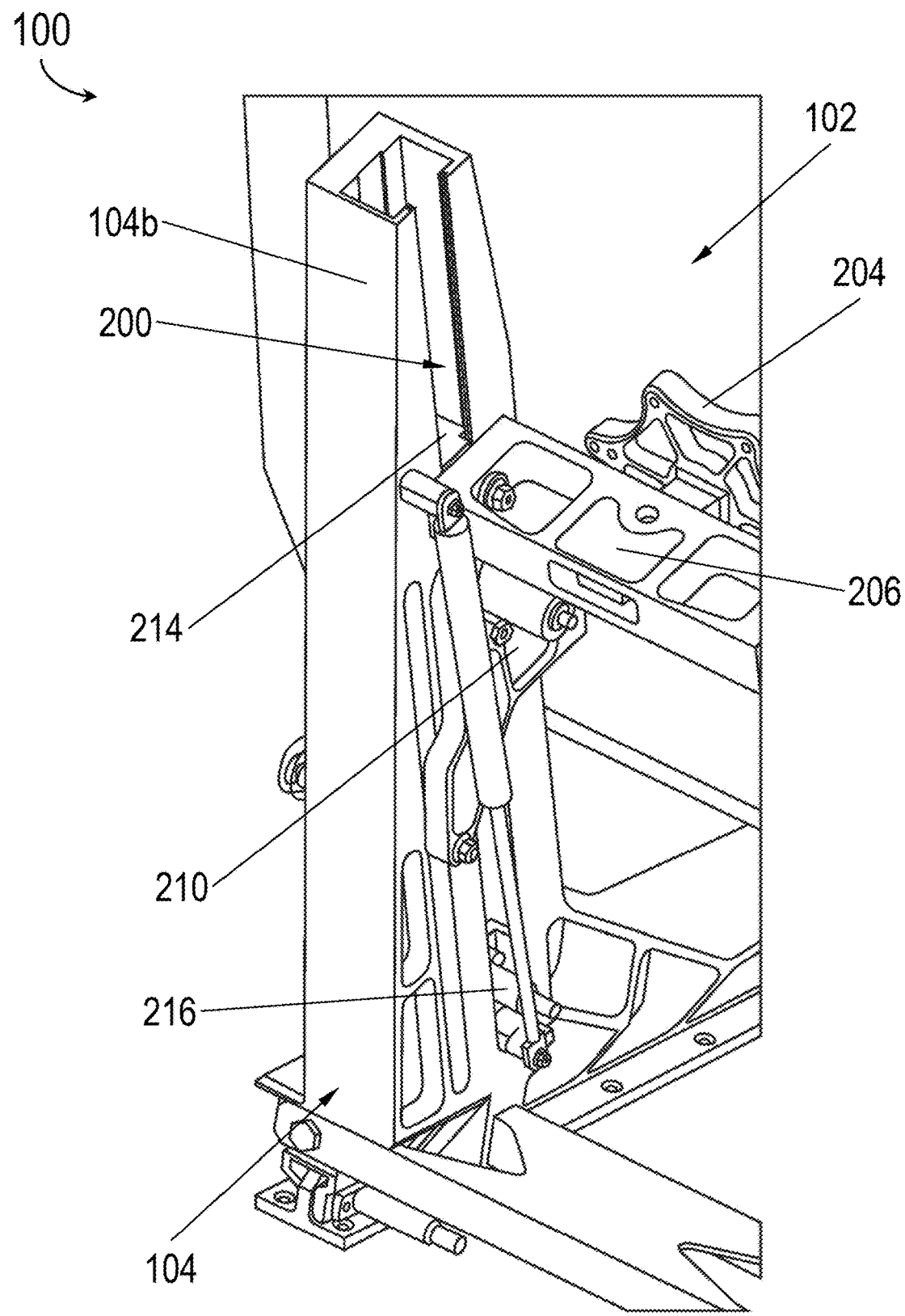

Referring now to FIGS. 2A through 2C, the seating assembly 100 is shown.

In embodiments, referring in particular to FIG. 2A, each of the left-side and right-side side panel portions 104b may include a linear upper bucket guide channel 200 machined or otherwise set into its interior face (e.g., set into the right side of the left-side side panel portion and into the left side of the right-side side panel portion) and a curved lower bucket guide slot 202 set into its exterior face (e.g., directly opposite each respective upper bucket guide channel).

In embodiments, the seat bucket 102 may be connected to the base seat structure 104 by an upper bracket assembly and a lower bracket assembly allowing adjustment of the seat bucket relative to the base seat structure (e.g., as indicated above, to accommodate pilots of varied heights) as well as energy attenuation (EA) stroking in response to a crash event. For example, the upper bracket assembly may include an upper bucket support bracket 204 fixed to the rear of the seat bucket 102, and an upper bucket support bracket receiver 206 fixed to the upper bucket support bracket and connecting the upper bucket support bracket to the lower bracket assembly. Similarly, in embodiments the lower bracket assembly may include a lower bucket support bracket 208 fixed to the seat bucket 102.

In embodiments, the upper and lower bracket assemblies, each fixed to the seat bucket 102, may be further connected to each other by a lower bucket support having an inner stabilizer bracket 210 and an outer stabilizer bracket 212. For example, each inner stabilizer bracket 210 may be fixed to (e.g., to either side of) the upper bucket support bracket receiver 206 and to the outer stabilizer bracket 212. In embodiments, referring in particular to FIGS. 2C and 2E, the upper bracket assembly may translate along the linear upper bucket guide channel 200 via an upper bucket support 214 configured to pivot within the inner stabilizer bracket 210 and translate within the linear upper bucket guide channel (e.g., via bearing, sliding, or rolling members). For example, the translation of the upper bucket support 214 within the linear upper bucket guide channel 200 may allow adjustment of the seat bucket 102 relative to the base seat structure 104 and may also provide EA stroking in response to a crash event, as discussed in greater detail below. In some embodiments, the linear upper bucket guide channel 200 may further include a vertical lockout adjustment device 216 (e.g., dampener) allowing the seat bucket 102 to be locked relative to the base seat structure at a particular incremental position.

Figure 2D:
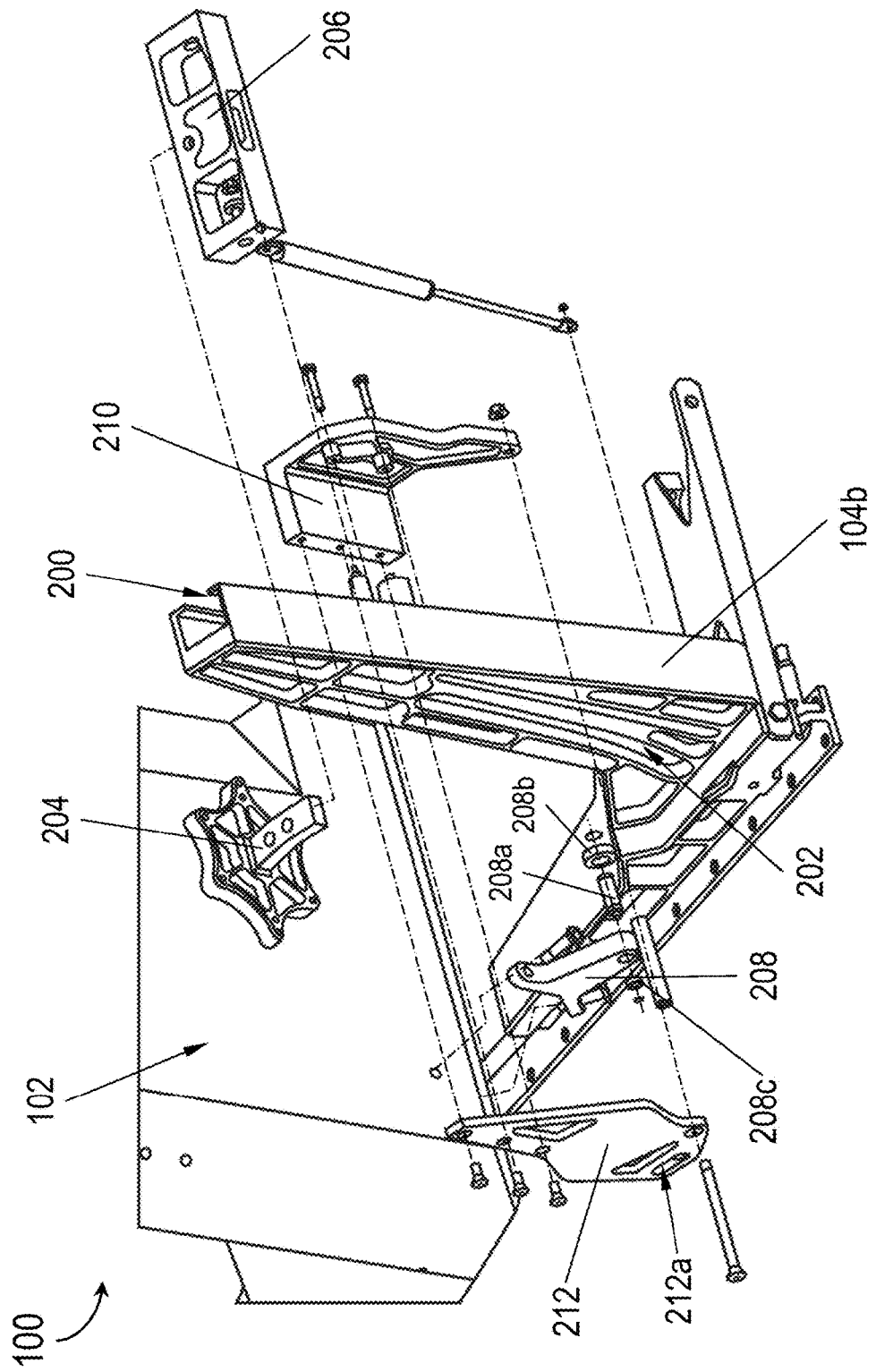
FIGS. 2D and 2E are respectively exploded views of the exterior and interior views of FIGS. 2B and 2C.
Figure 2E:
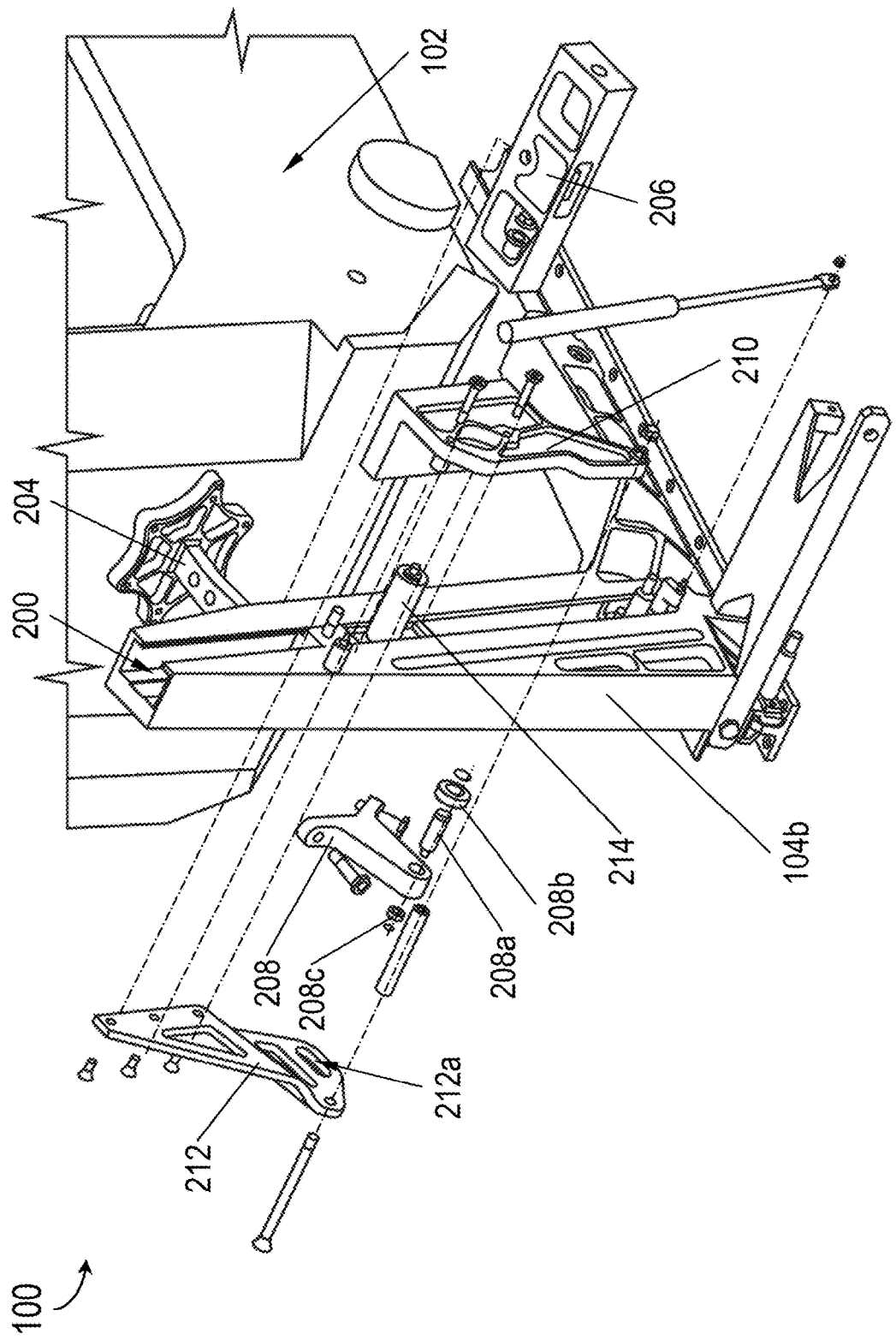

In embodiments, referring in particular to FIGS. 2A, 2B, and 2D, the outer stabilizer bracket 212 may be pivotably attached to the lower bucket support bracket 208, which in turn may translate along the curved lower bucket guide slot 202 via axle 208a and inner bearing 208b. The lower bucket support bracket 208 may further include an outer bearing 208c. For example, the outer bearing 208c may slidably translate within a roller slot 212a set into the outer stabilizer bracket 212 as the lower bucket support bracket 208 translates through the lower curved portion of the curved lower bucket guide slot 202 (as shown in greater detail below), allowing the seat bucket 102 to pivot forward and away from the base seat structure 104.

Referring now to FIGS. 3A-3F and 4A-4F, the seating assembly 100 is shown. For each left-side profile view shown by FIGS. 3A through 3F, FIGS. 4A through 4F provide a respective counterpart rear isometric view.

Figure 3A:
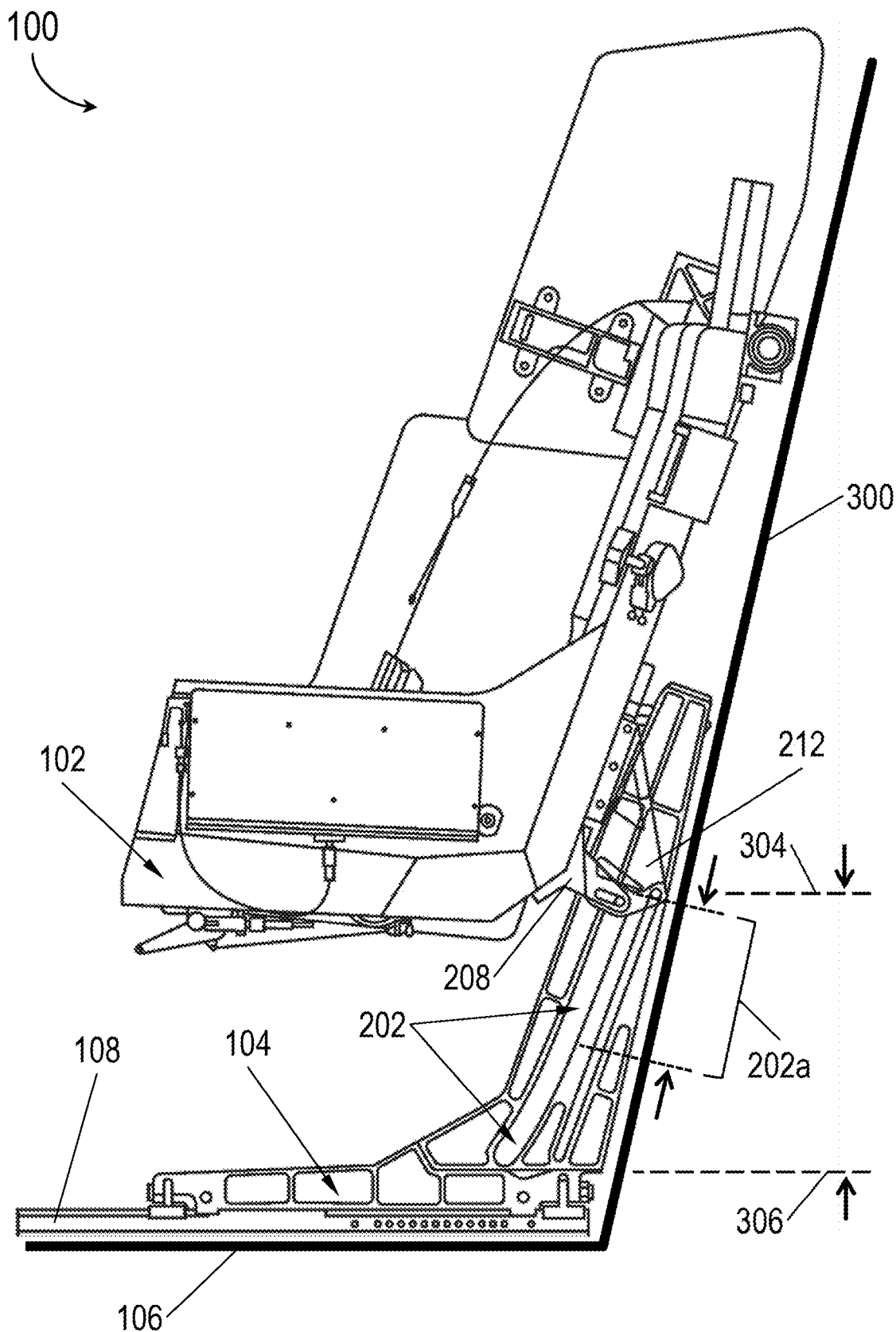
FIGS. 3A through 3C are left-side profile views of seat bucket adjustment operations of the seating assembly of FIG. 1.
Figure 4A:
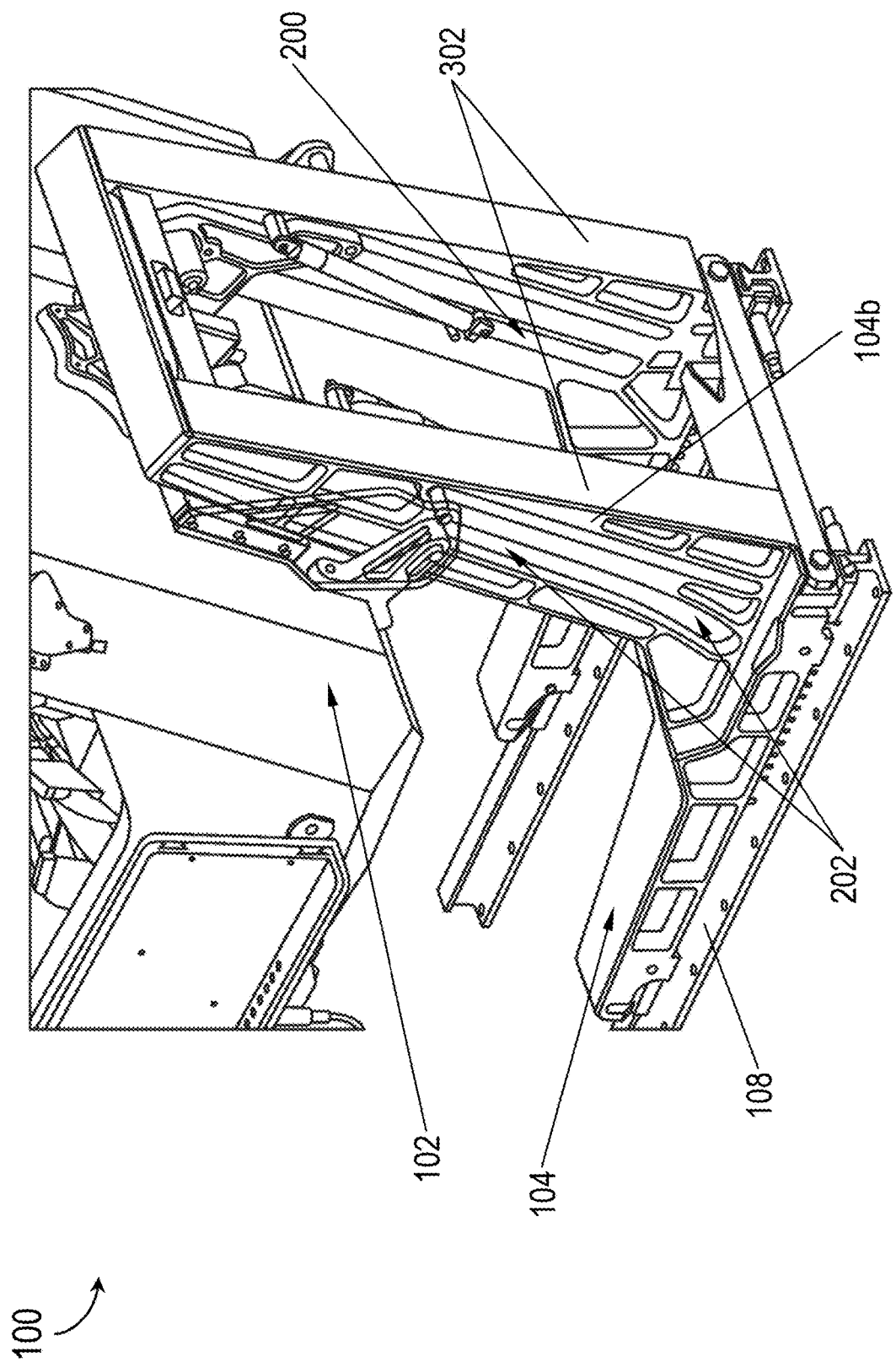
FIGS. 4A through 4C are counterpart rear isometric views of the seat bucket adjustment operations of FIGS. 3A through 3C.
Figure 4B:
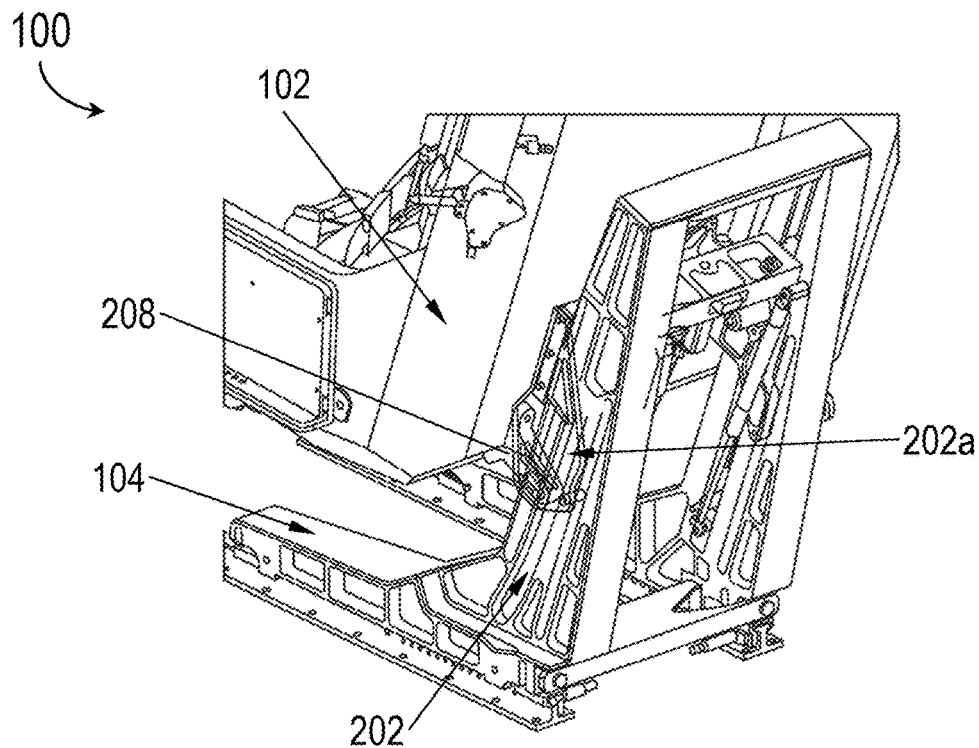

Referring to FIGS. 3A and 4A, the seating assembly 100 is shown in a fully-up and fully-aft configuration. For example, the base seat structure 104, configured for translation along the tracks 108, may be set in a rearmost position relative to the tracks. In embodiments, the tracks 108 may be set into the flight deck floor 106 such that the tracks terminate substantially adjacent to a rear bulkhead wall 300. For example, when in the fully-aft position shown by FIGS. 3A and 4A, the rear faces 302 of the left-side and right-side side panel portions 104b may be substantially flush with the rear bulkhead wall 300. For example, the base seat structure 104 may be locked in one of several incremental positions relative to the tracks 108 and relative to the rear bulkhead wall 300 (e.g., via a pin-and-slot system or any other appropriate means of securing the base seat structure into a position relative to the tracks.

In embodiments, the incorporation of the curved lower bucket guide slot 202 may enable the side panel portions 104b, and therefore the base seat structure 104 as a whole, to have an optimally minimal height relative to the flight deck floor 106. Accordingly, even when mounted substantially flush to a rear bulkhead wall 300 (as shown by FIG. 3A), the seating assembly 100 may still provide for reclining of the seat bucket 102 relative to the base seat structure 104 (e.g., by tracking the seating assembly forward relative to the tracks 108, and/or via pivoting of the outer stabilizer bracket 212 relative to the base seat structure and lower bucket support bracket 208) if the rear bulkhead wall 300 (or the position of the base seat structure relative to the rear bulkhead wall) and the height of the seat bucket relative to the base seat structure provides sufficient space).

In embodiments, the linear upper bucket guide channel (200, FIGS. 2C/2E) and the curved lower bucket guide slot 202 may extend (e.g., on either side of each side panel portion 104b) between the same maximum height 304 and minimum height 306 relative to the base portion 104a and to the flight deck floor 106. The curved lower bucket guide slot 202 may include a substantially linear upper portion 202a through which the lower bucket support bracket 208 may translate (referring also to FIGS. 3B and 4B), e.g., for adjustment of the seat bucket 102 relative to the base seat structure 104 to accommodate taller or shorter pilots (e.g., through the range 110, FIG. 1).

Figure 3C:
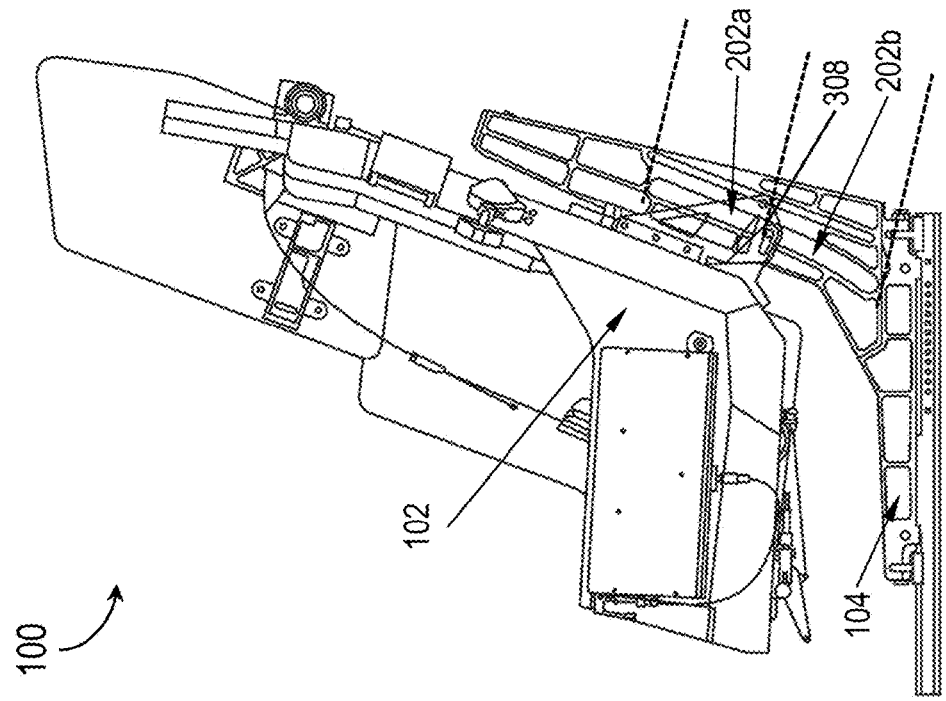
Figure 3B:
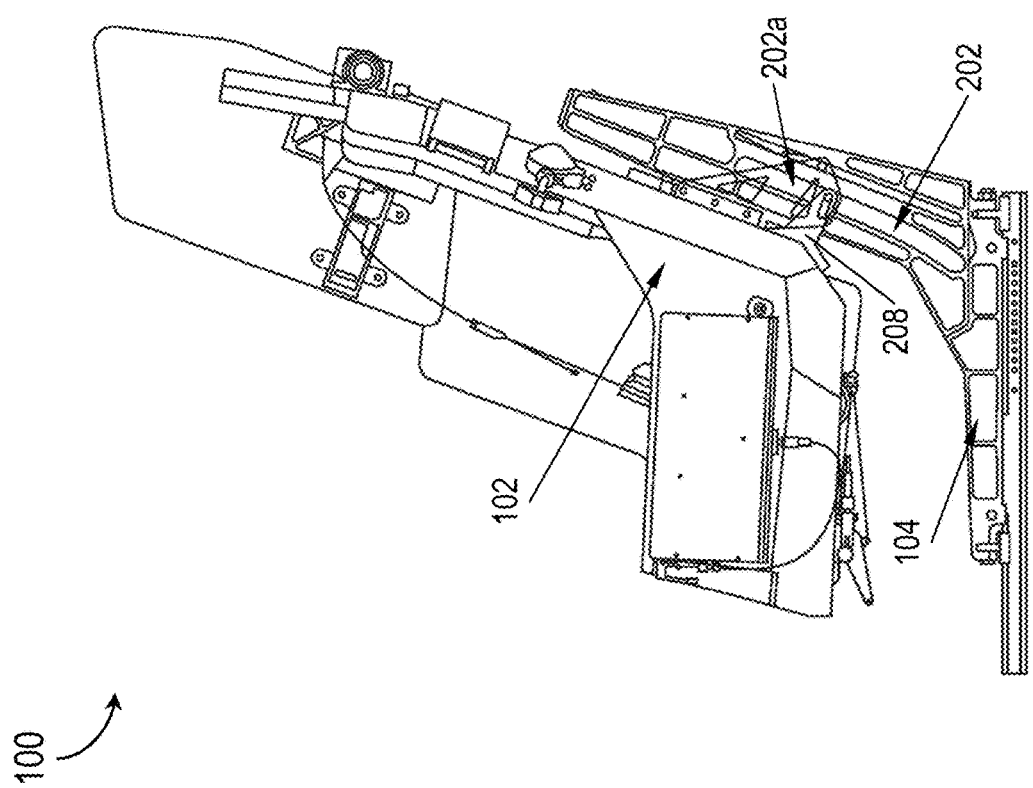
Figure 3D:
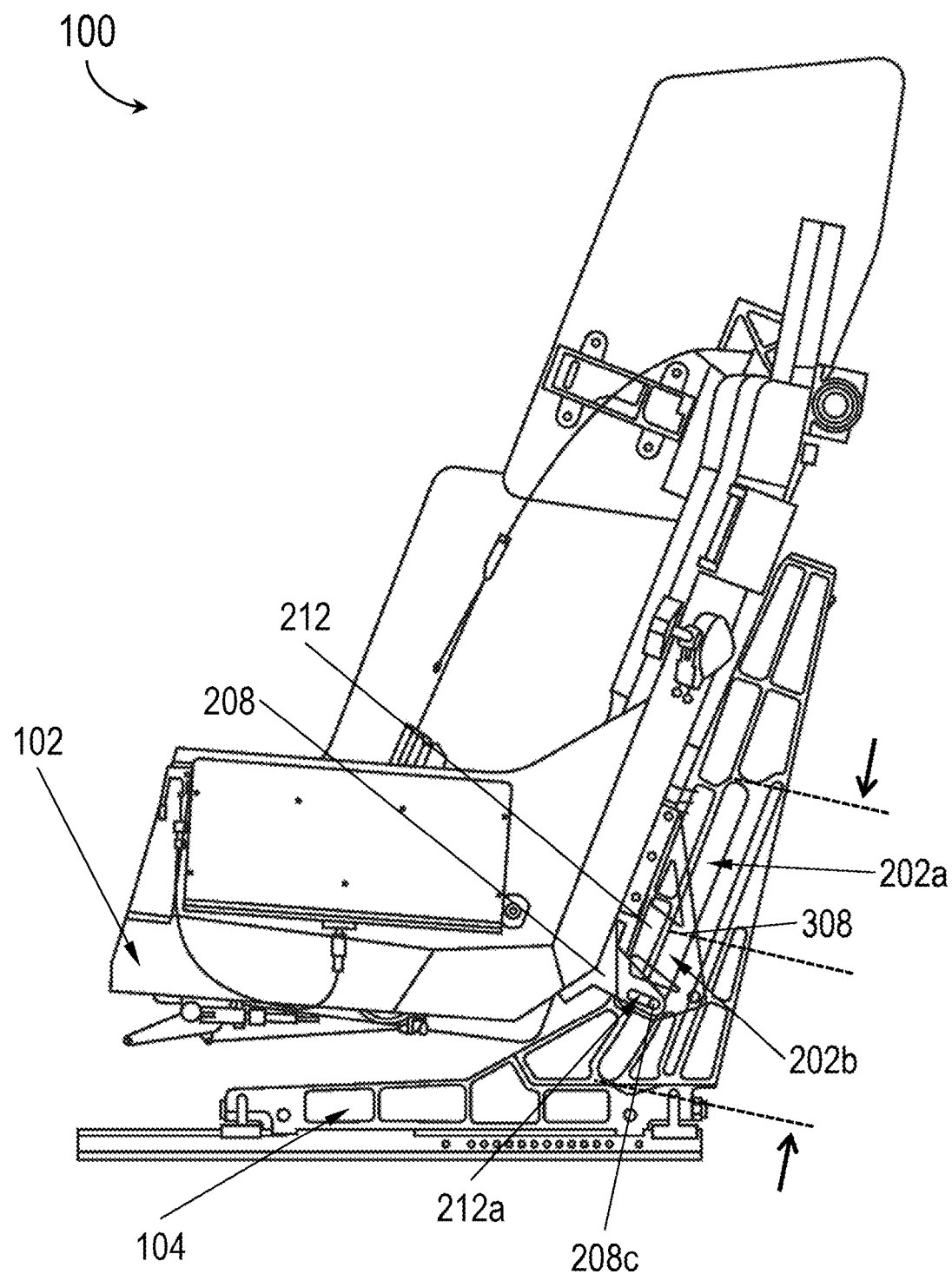
Figure 4C:
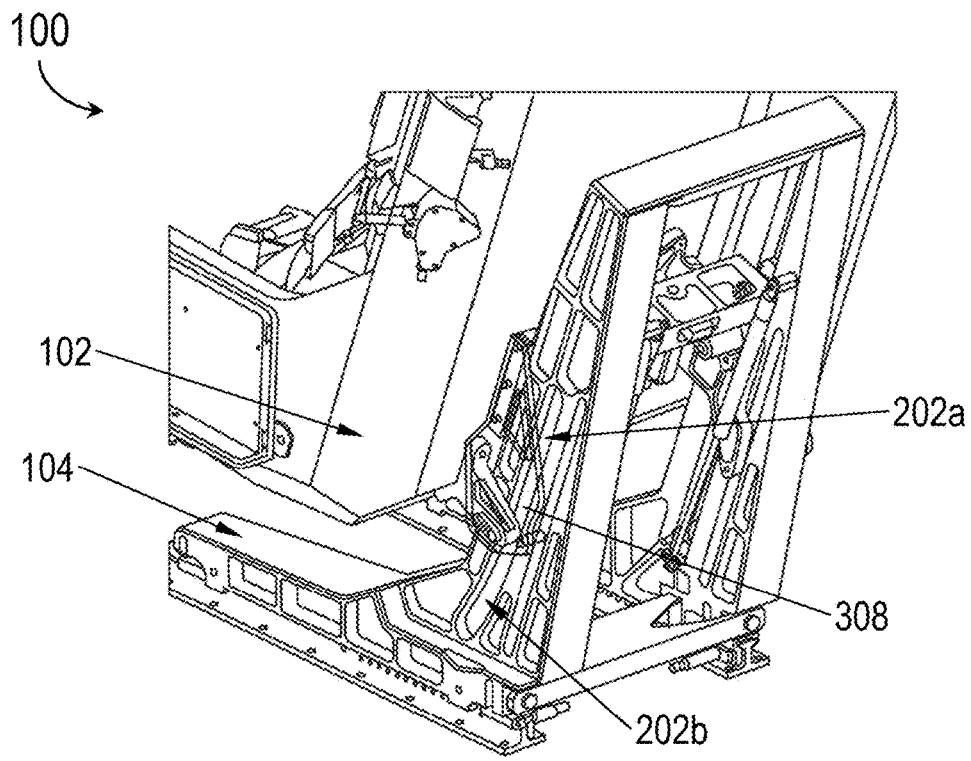
Figure 4D:
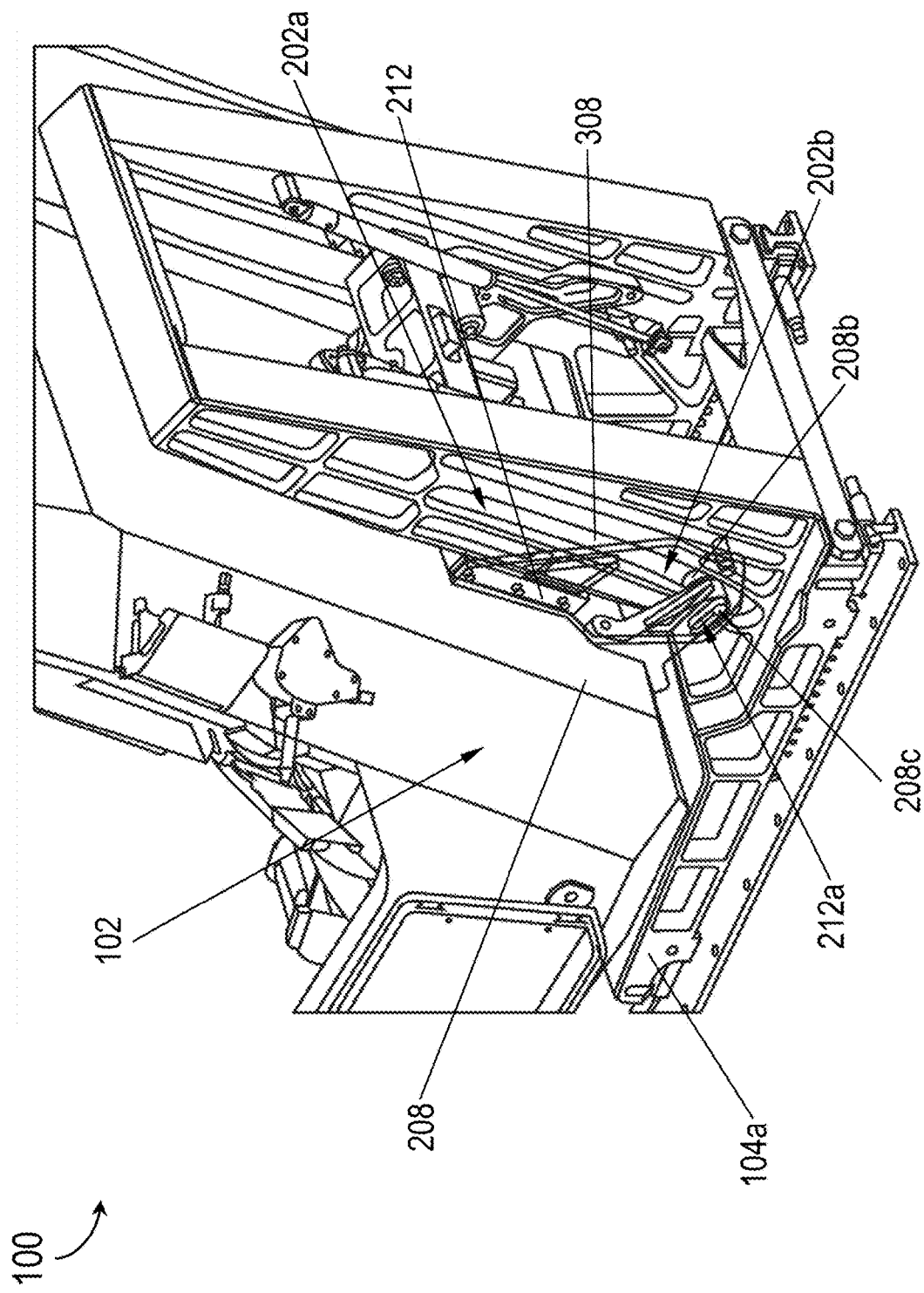
FIGS. 4D through 4F are counterpart rear isometric views of the EA stroking operations of FIGS. 3D through 3F.
Figure 4E:
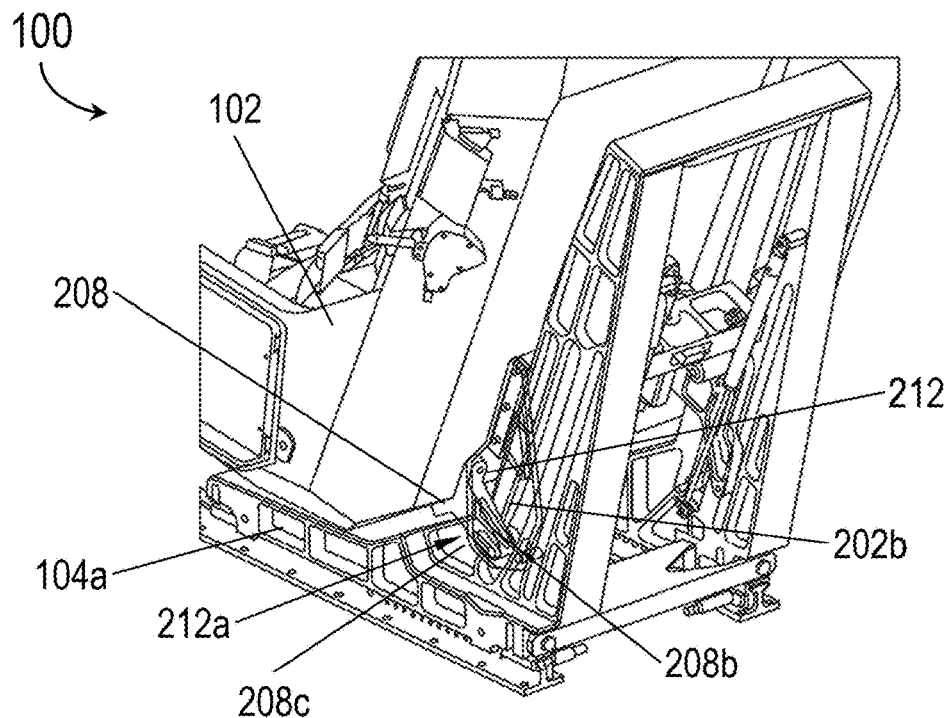
Figure 4F:
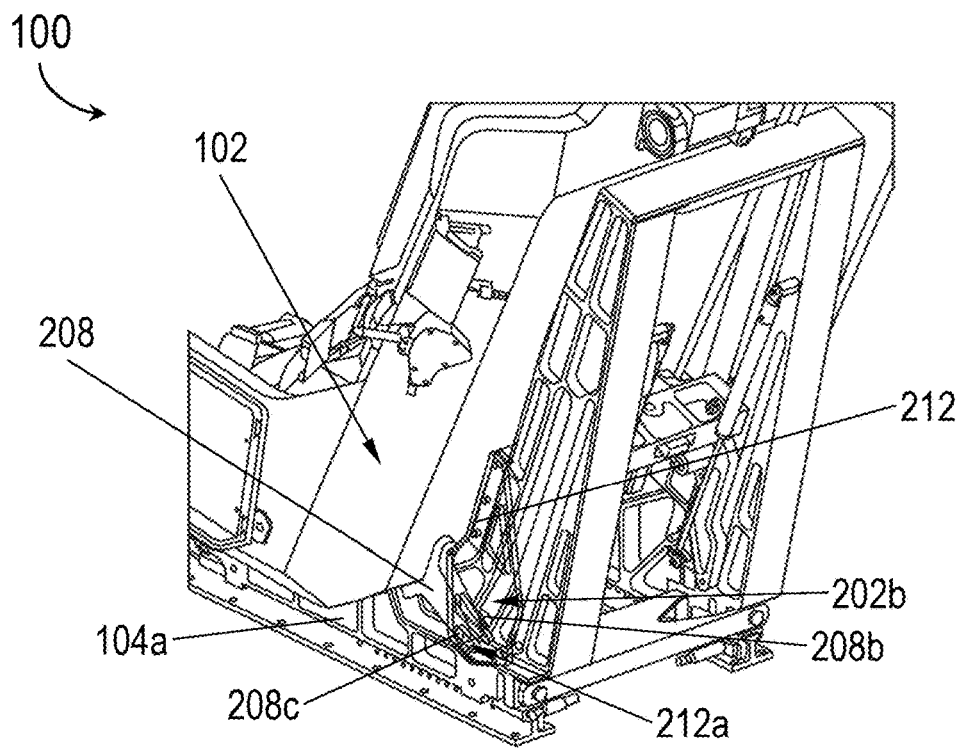
Figure 5A:
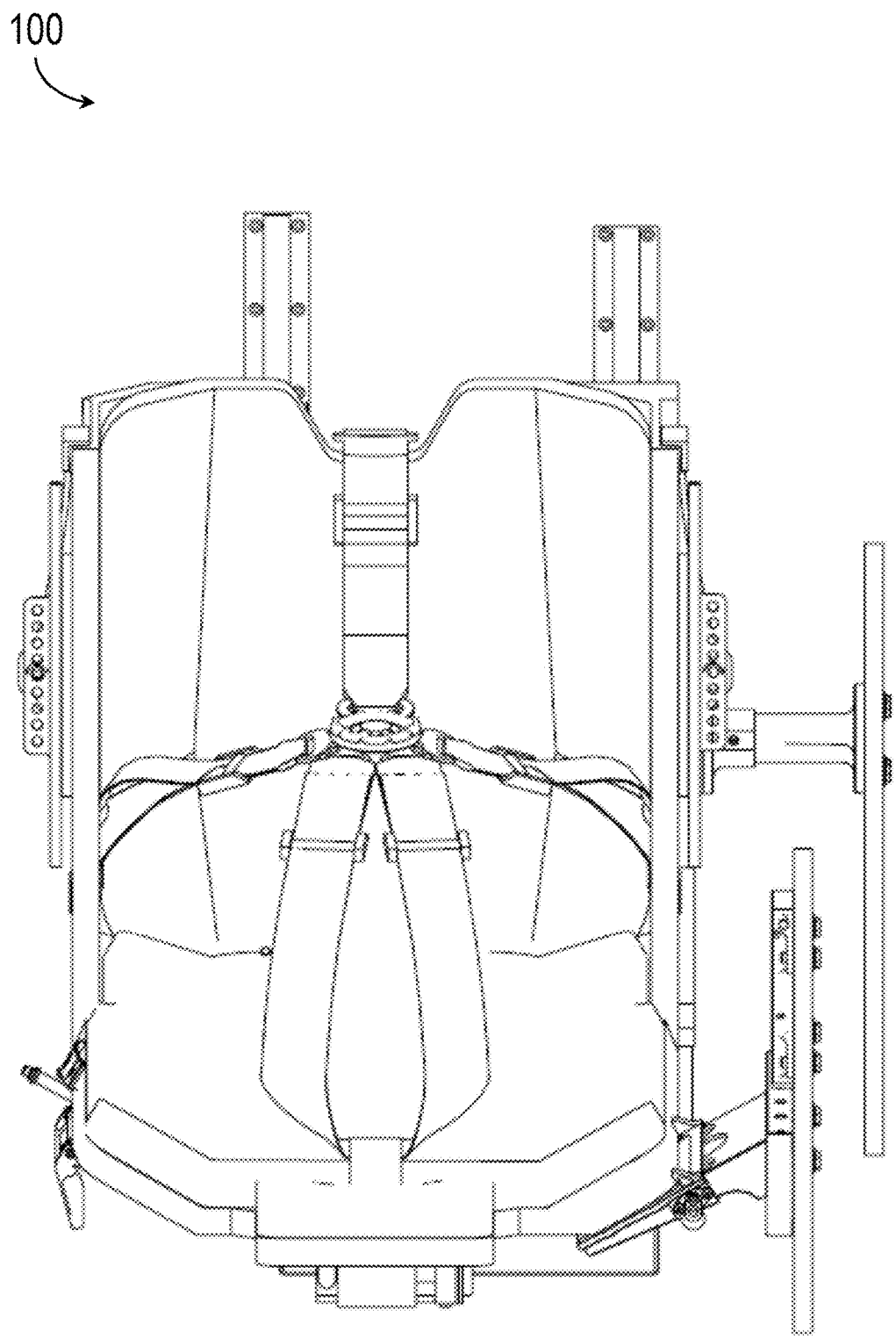
FIGS. 5A, 5B, 5C, 5D, 5E, and 5F are respectively top/overhead, bottom/underside, right-side profile, left-side profile, forward, and rear views of the rotorcraft seating assembly of FIG. 1.
Figure 5B:
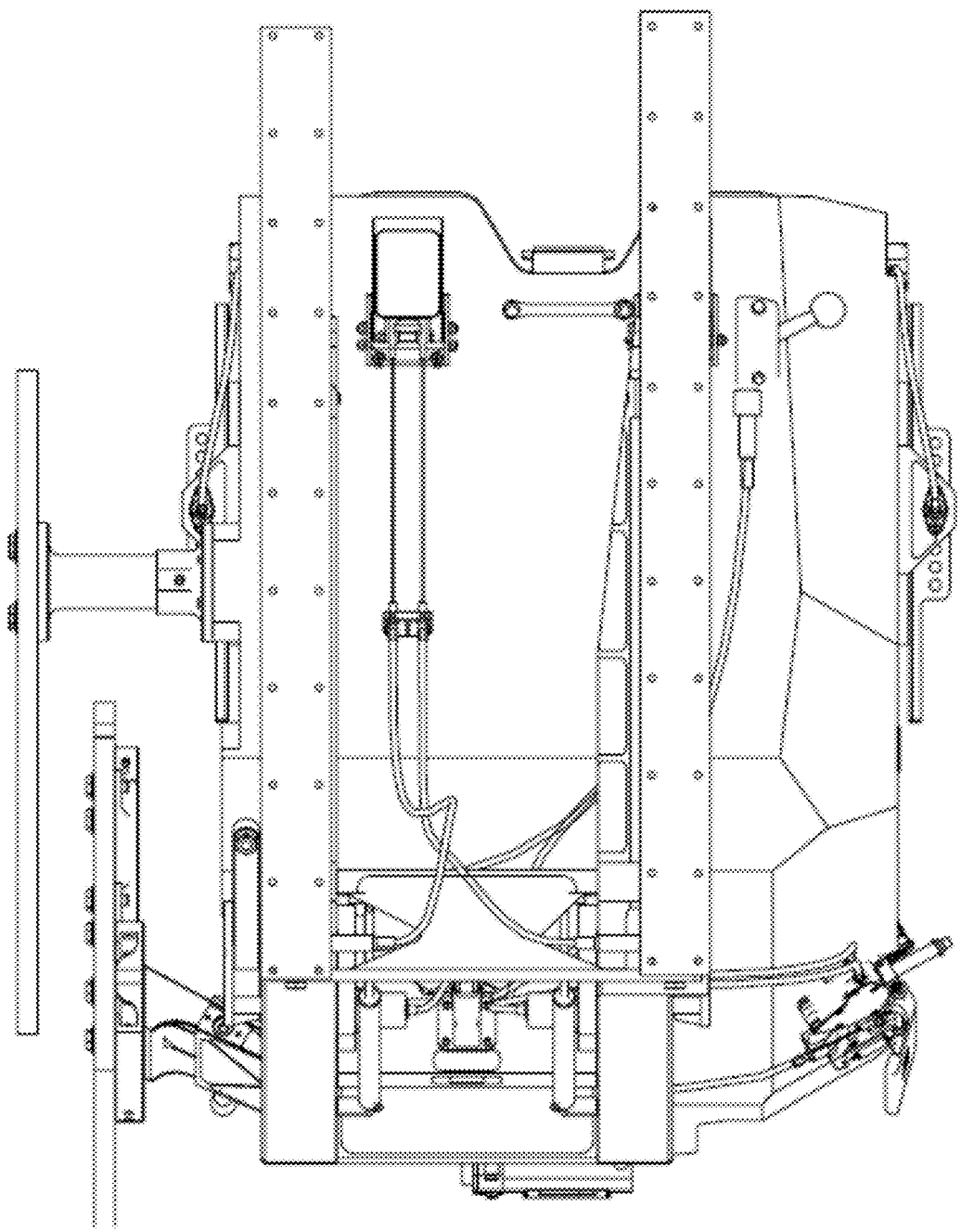
Figure 5C:
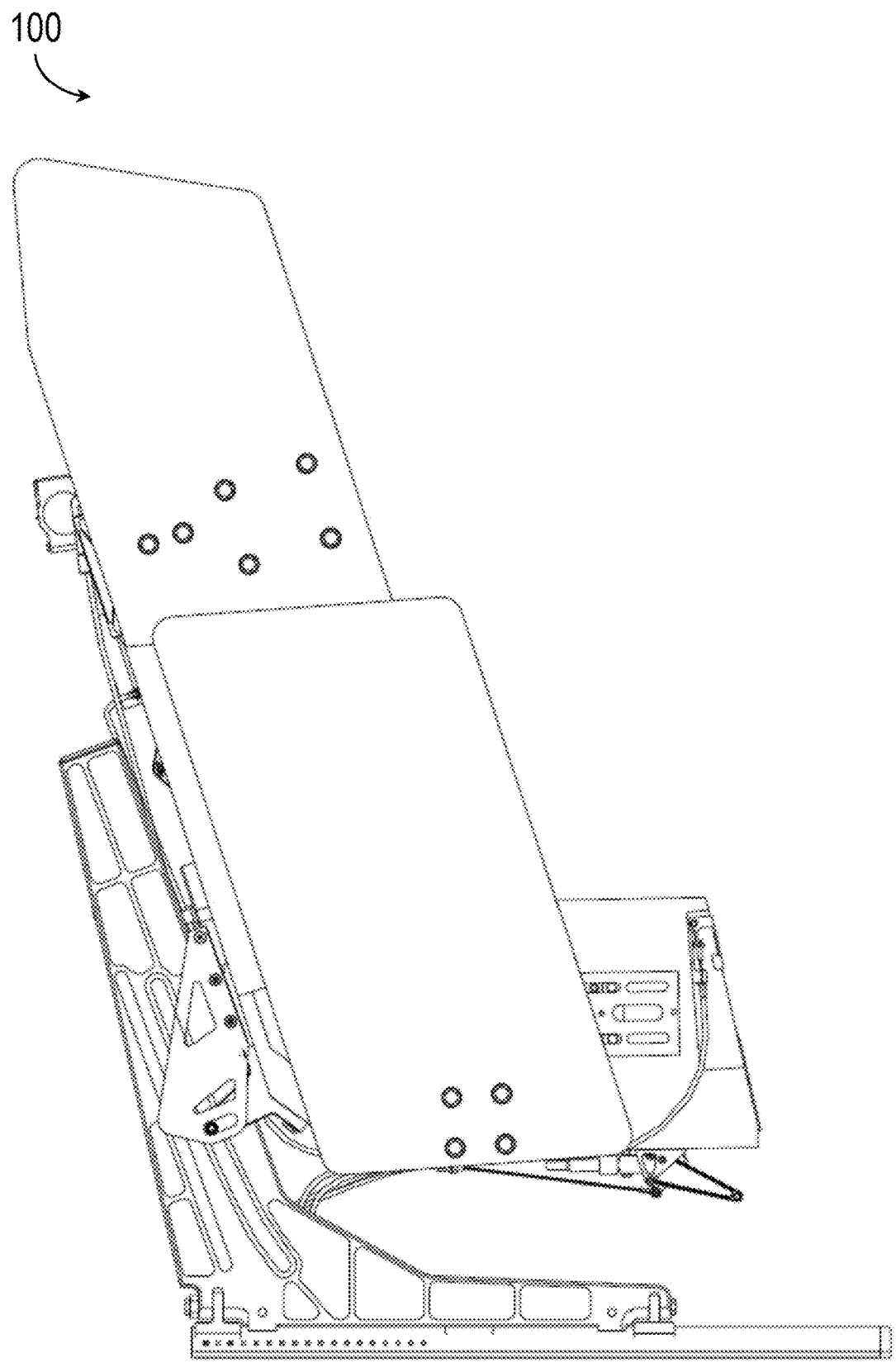
Figure 5D:
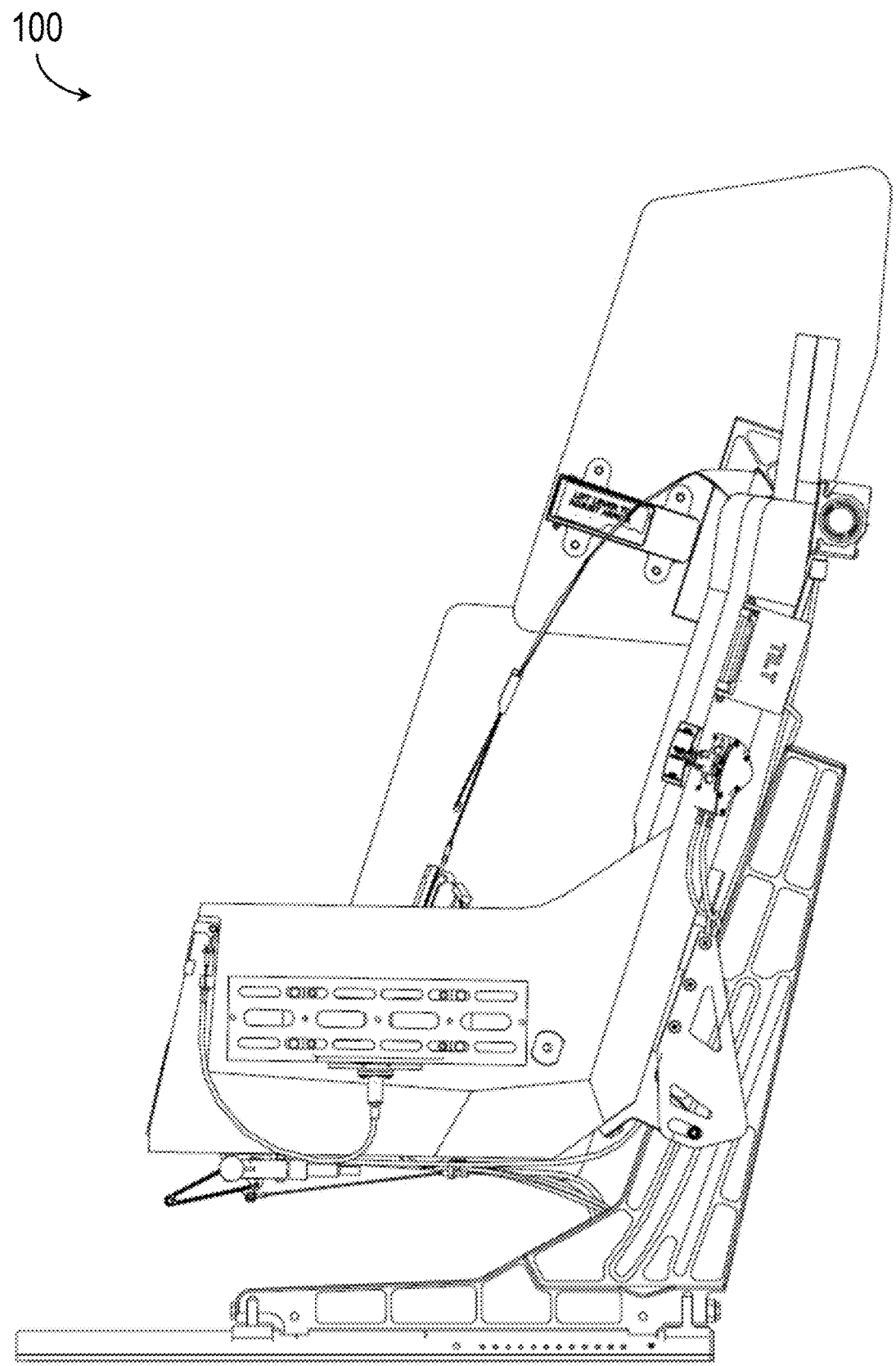
Figure 5E:
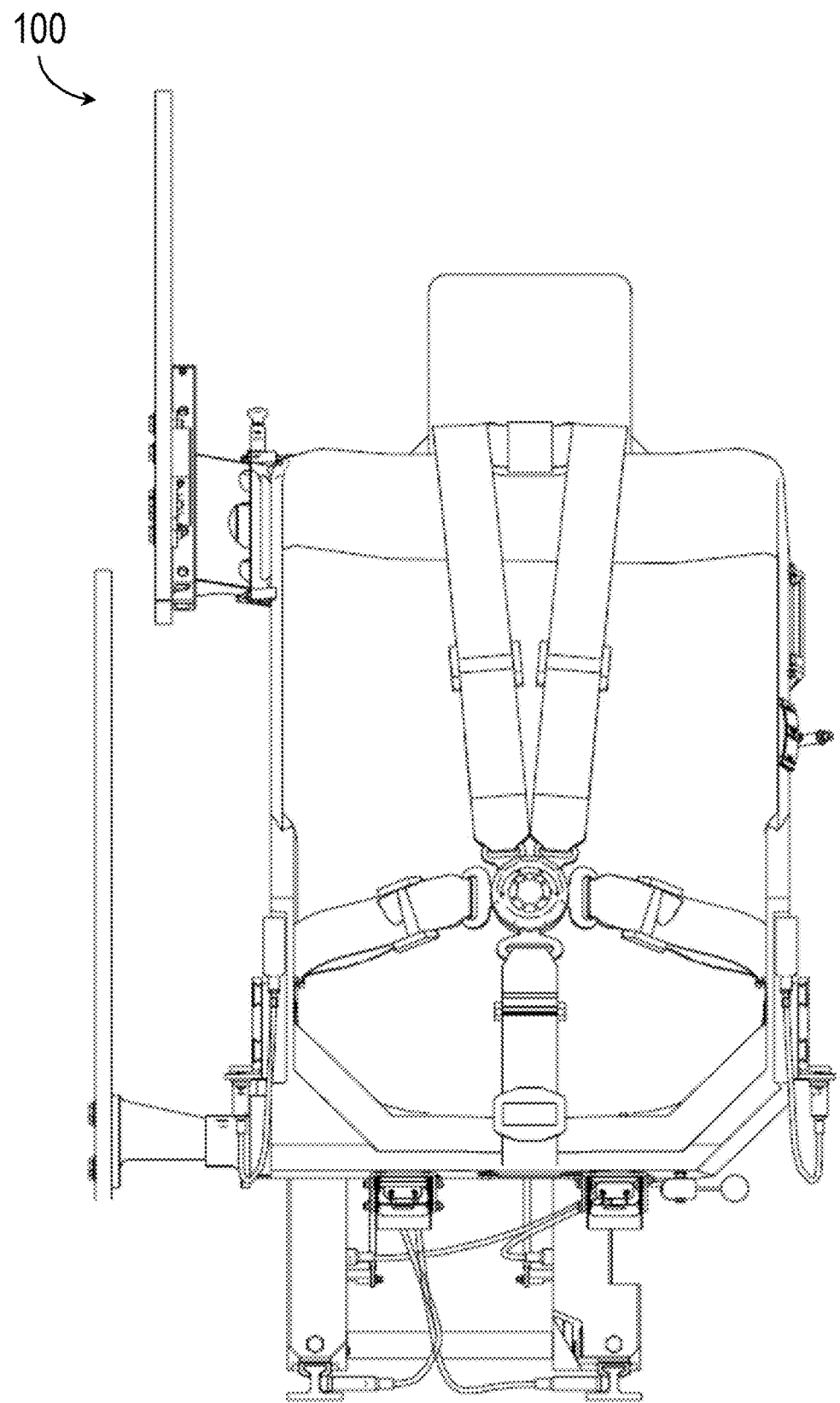
Figure 5F:
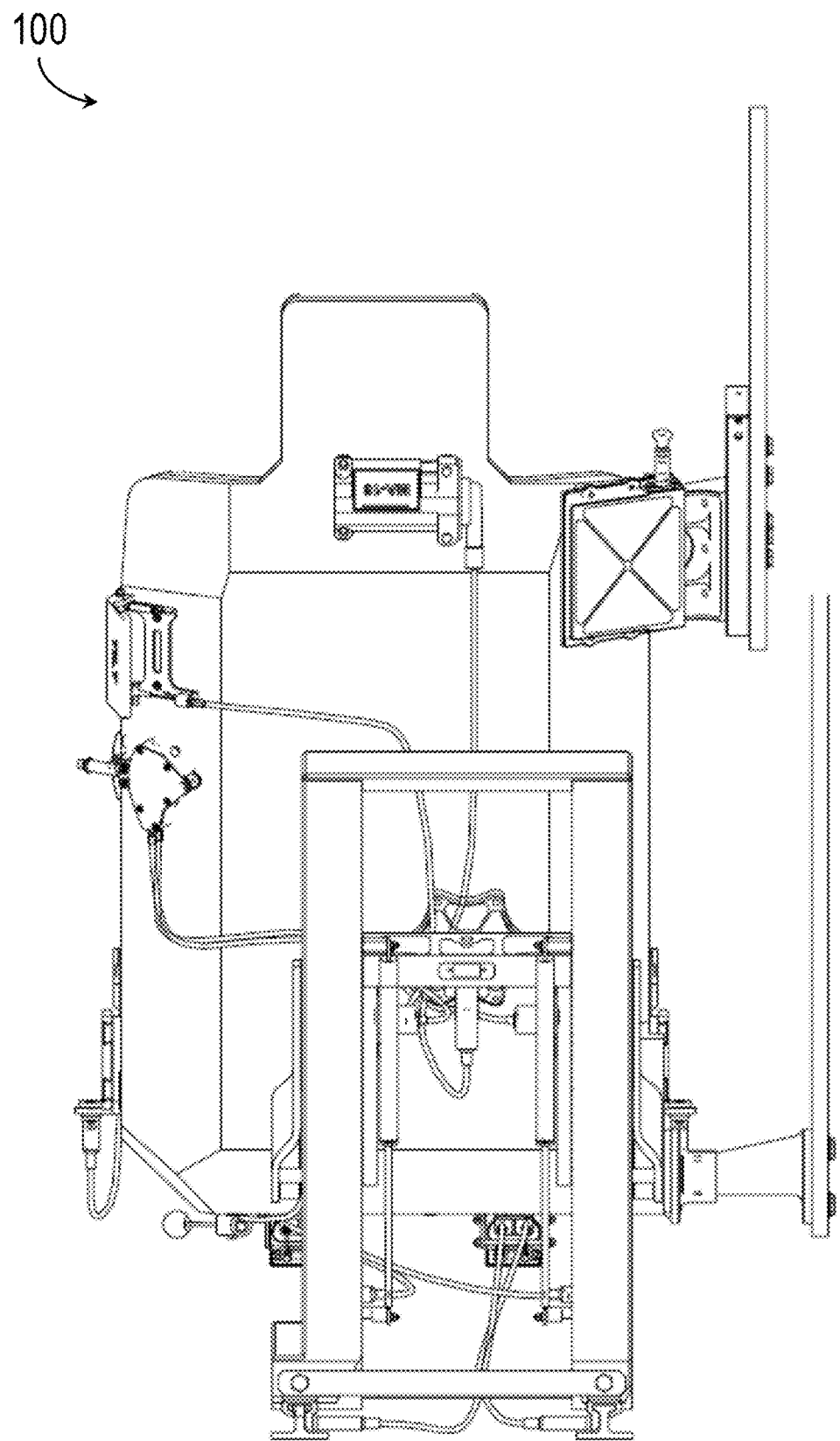

Referring now to FIGS. 3C and 4C, the seating assembly 100 is shown at the lower end of the normal range of travel of the seat bucket 102 relative to the base seat structure 104, e.g., the point 308 corresponding to the lower end of the substantially linear upper portion 202a of the curved lower bucket guide slot (202, FIG. 3A/B). For example, when in the position shown by FIGS. 3C and 4C, the seating assembly 100 may be configured for accommodating the tallest percentiles of pilots or operators.

Referring now to FIGS. 3D through 3F and 4D through 4F, the seating assembly 100 is shown in a crash event.

In embodiments, at the point 308 the curved lower bucket guide slot 202 may transition from the substantially linear upper portion 202a to a curved lower portion 202b. For example, as the lower bucket support bracket 208 begins to translate downward through the curved lower portion 202b, the upper bucket support (214, FIGS. 2C/2E) may begin stroking through the upper bucket guide channel (200, FIGS. 2C/2E), e.g., to attenuate downward force associated with the crash event. In embodiments, as the lower bucket support bracket 208 (e.g., the inner bearing (208b, FIGS. 2C/2E) thereof) continues through the curved lower portion 202b of the curved lower bucket guide slot 202, the outer bearing 208c may shift forward relative to the roller slot 212a set into the outer stabilizer bracket 212, allowing the lower bucket support bracket (e.g., and the seat bucket 102 fixed thereto) forward and away from the base portion 104a of the base seat structure 104. In embodiments, the precise dimensions of the curved lower portions 202b (e.g., degree of curvature, length of curvature) may vary according to cockpit/cabin configuration and dimensions.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A rotorcraft seating assembly, comprising:
a seat bucket and a base seat structure, the base seat structure configured to support the seat bucket in a seating position, the base seat structure comprising:
a base portion mountable to a flight deck floor of a rotorcraft;
and
left and right side panel portions rising from the base portion and inclined relative to the base portion, each side panel portion comprising:
a bucket guide channel set into an inside face of the side panel portion;
and
a bucket guide slot set into an outside face of the side panel portion opposite the bucket guide channel, the bucket guide slot fixed relative to the bucket guide channel and comprising 1) a linear upper portion and 2) an arcuate lower portion;
the seat bucket slidably coupled to each of the left and right side panel portions by the bucket guide channel and the bucket guide slot, the seat bucket configured to:
support an operator of the rotorcraft;
and
in response to a dynamic event:
attenuate a crash energy of the seat bucket by slidably translating along the bucket guide channel;
and
stroke the seat bucket in a downward and a forward direction by slidably translating along the arcuate lower portion of the bucket guide slot.

2. The rotorcraft seating assembly of claim 1, wherein the bucket guide channel and the bucket guide slot extend between a first height above the base portion to a second height above the base portion.

3. The rotorcraft seating assembly of claim 1, wherein the seat bucket is slidably coupled to the left and right side panel portions by:
an upper bracket assembly fixed to the seat bucket and configured to slidably translate along the bucket guide channel;
and
a lower bracket assembly fixed to the seat bucket, the lower bracket assembly configured to slidably translate along the bucket guide slot.

4. The rotorcraft seating assembly of claim 3, wherein:
the upper bracket assembly is configured to slidably translate along the bucket guide channel via an upper bracket support pivotably coupled to the upper bracket assembly, the upper bracket support configured to attenuate the energy of the seat bucket by stroking downward through a lower portion of the bucket guide channel corresponding to the arcuate lower portion of the bucket guide slot.

5. The rotorcraft seating assembly of claim 3, wherein:
the lower bracket assembly includes 1) a lower bucket support bracket configured to slidably translate along the bucket guide slot via at least one inside bearing and 2) at least one outside bearing sharing a common axle with the inside bearing;
and
a stabilizer bracket fixed to the upper bracket assembly and including at least one stabilizer slot configured to accept the outside bearing, the outside bearing configured to slidably translate along the stabilizer slot as the inside bearing translates along the arcuate lower portion of the bucket guide slot.

6. The rotorcraft seating assembly of claim 1, wherein:
the base portion is mountable to the flight deck floor via two or more tracks fixed to the flight deck floor and extending in parallel along the flight deck floor,
wherein
the base seat structure is configured to slidably translate along the two or more tracks.

7. The rotorcraft seating assembly of claim 6, wherein the two or more tracks extend along the flight deck floor beneath the seat bucket.

8. The rotorcraft seating assembly of claim 6, wherein the two or more tracks extend along the flight deck floor, one track of the two or more tracks extending beneath the seat bucket.

9. The rotorcraft seating assembly of claim 1, wherein:
the seat bucket is configured to recline relative to the base seat structure.

10. The rotorcraft seating assembly of claim 1, wherein:
in response to the dynamic event, the seat bucket is configured to pivot in the forward direction without impacting the flight deck floor.

* * * * *